Figure 1:
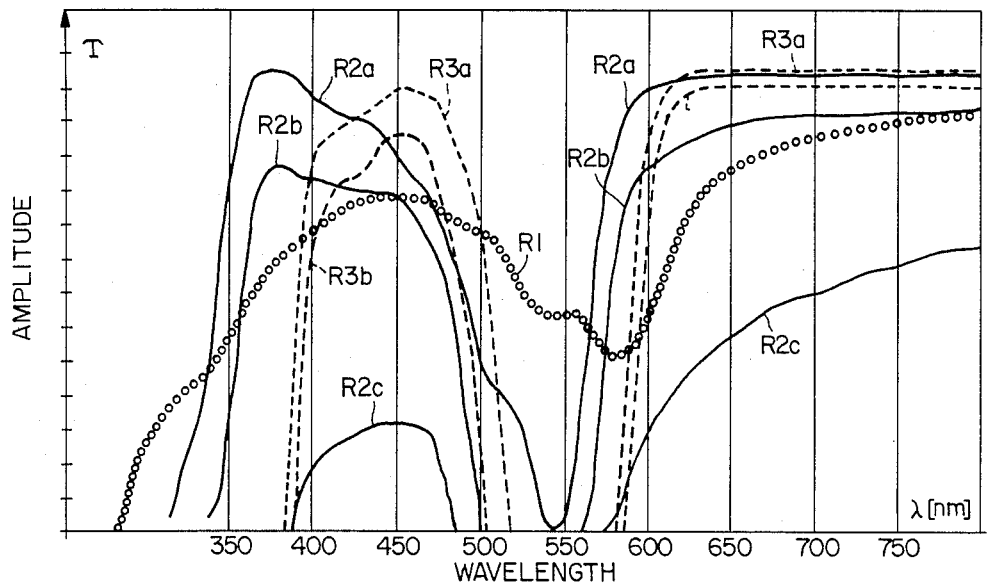

United States Patent [19]

Boldt

[11] Patent Number: 4,740,059
[45] Date of Patent: Apr. 26, 1988

[54] METHOD AND APPARATUS FOR COLOR SYNTHESIS

[76] Inventor: Birger Boldt, Rudolf-Hilferding-Strasse 52, 6000 Frankfurt/Main Nordweststadt, Fed. Rep. of Germany

[21] Appl. No.: 767,262
[22] PCT Filed: Dec. 19, 1984
[86] PCT No.: PCT/EP84/00411
  § 371 Date: Aug. 13, 1985
  § 102(e) Date: Aug. 13, 1985
[87] PCT Pub. No.: WO85/02916
  PCT Pub. Date: Jul. 4, 1985

[30] Foreign Application Priority Data

Dec. 23, 1983 [DE] Fed. Rep. of Germany ....... 3346712
Sep. 11, 1984 [DE] Fed. Rep. of Germany ....... 3433265

[51] Int. Cl.$^4$ .......................... G02B 5/23; G02B 5/26
[52] U.S. Cl. ..................................... 350/317; 350/318; 350/315
[58] Field of Search .................. 350/311, 314–318, 350/320, 409, 438, 439

[56] References Cited

U.S. PATENT DOCUMENTS 1,953,958  4/1934  Gilmore .
2,673,923  3/1954  Williams ............................. 350/317
3,089,386  5/1963  Hunt .................................... 350/316
3,260,152  7/1966  Aston .................................. 350/317
4,008,482  2/1977  Lang .

FOREIGN PATENT DOCUMENTS 1193355  1/1966  Fed. Rep. of Germany .
1622975  1/1971  Fed. Rep. of Germany .
1059148  2/1967  United Kingdom ................ 350/315

OTHER PUBLICATIONS

Scientific American Band 200, May 1959, Experiments in Color Vision, pp. 84–99, by Edwin H. Land.
Principles of Color Television, Hazeltine Laboratories Staff, John Wiley & Sons, 1956, pp. 22–27.

Primary Examiner—John K. Corbin
Assistant Examiner—Loha Ben
Attorney, Agent, or Firm—Felfe & Lynch

[57] ABSTRACT

Method and apparatus for color synthesis by optical mixing of several colors and varying the relative intensity of at least one of the colors for the purpose of producing a great number of hues over the spectral range. The two colors "red-violet" and "green" are used exclusively, which are distinguished by an entirely specific spectral characteristic. The transmission curve for "red-violet" has a maximum between 370 and 460 nm and a minimum between 540 and 580 nm. The transmission curve for "green" has a transmission maximum between 520 and 560 nm and a minimum between 640 and 670 nm. The process is especially suited for image construction within a limited picture field, namely by locally differing mixture of several colors and local variation of the relative intensity or saturation of at least one of the two colors.

22 Claims, 15 Drawing Sheets

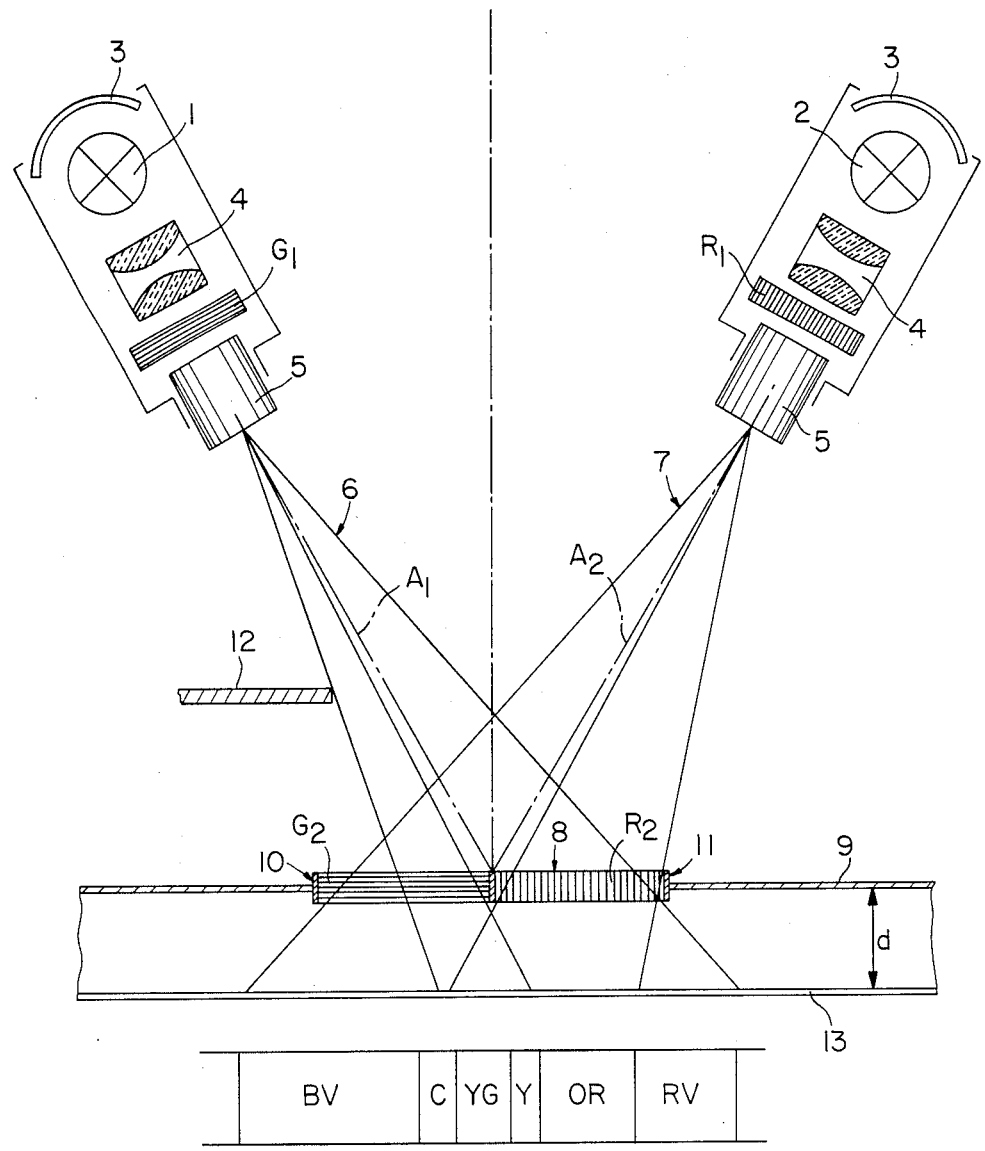

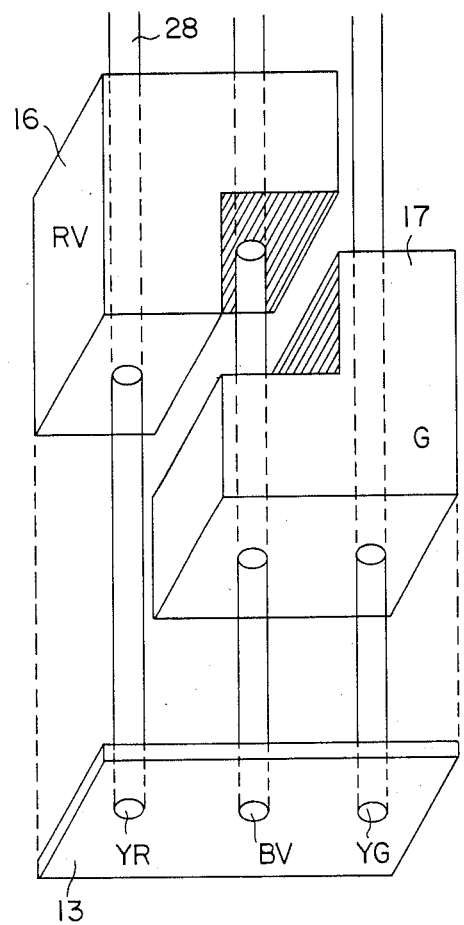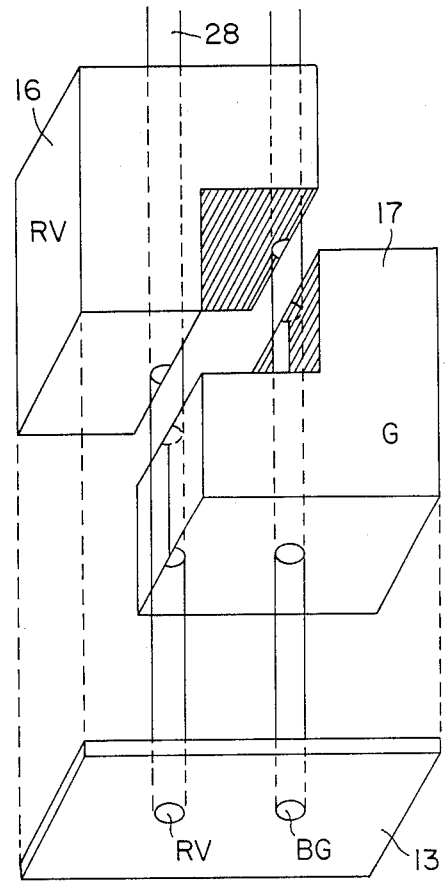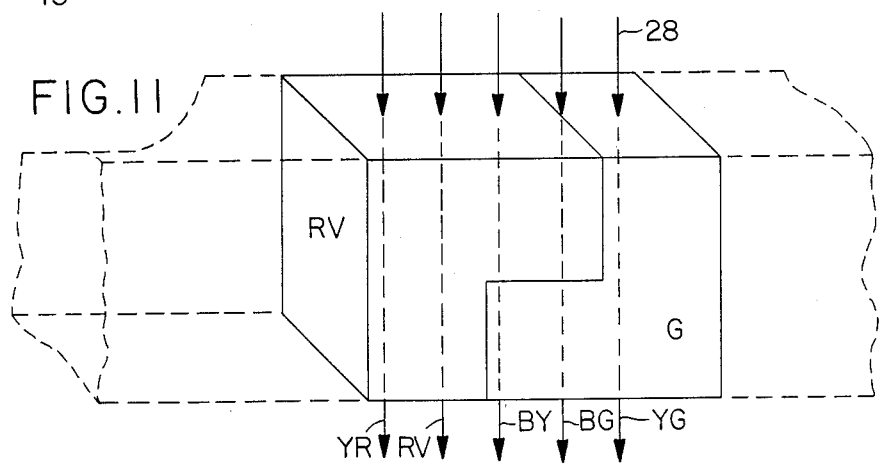

FIG. 16
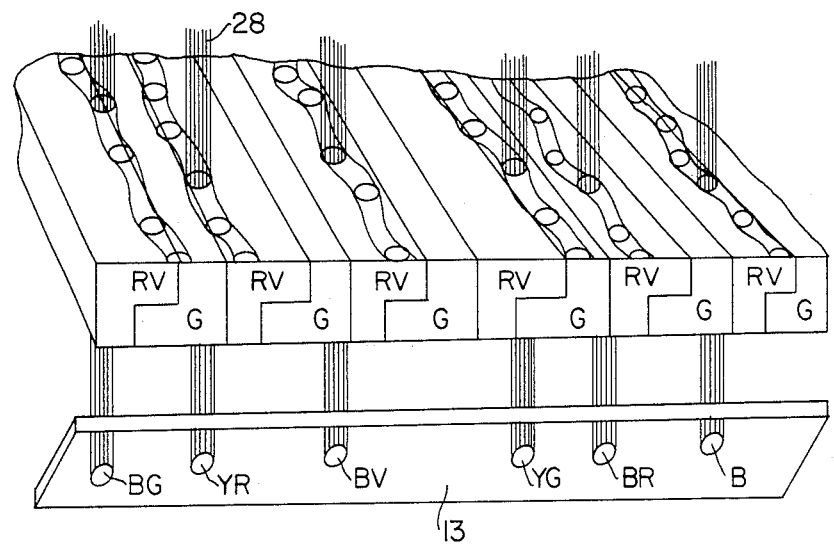
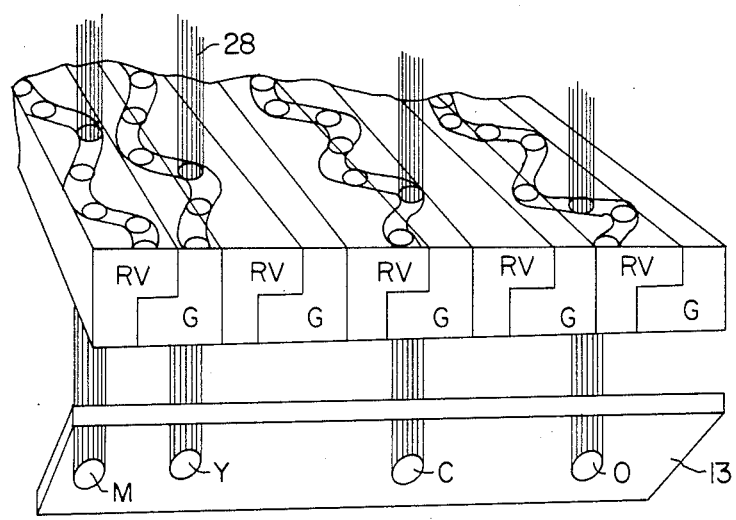
FIG. 17

FIG. 18
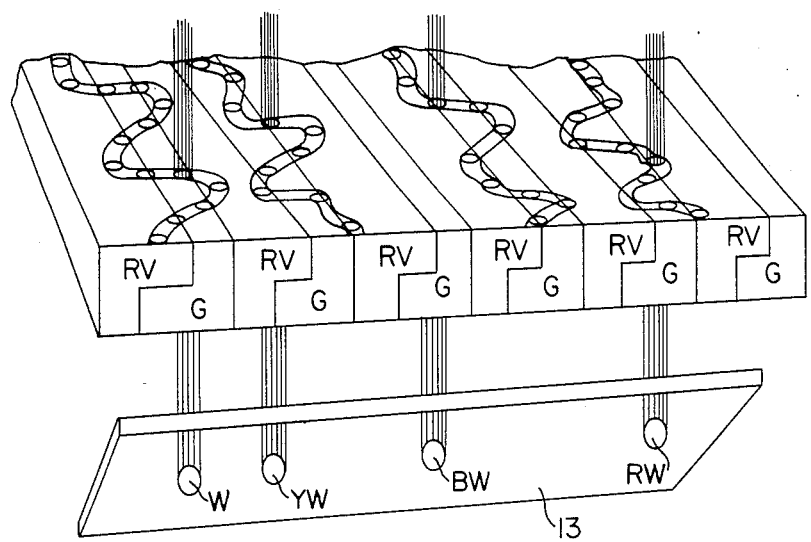
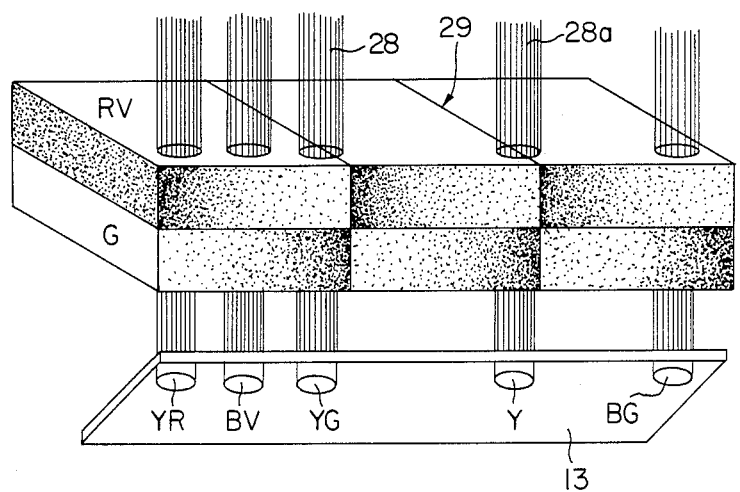
FIG. 19

METHOD AND APPARATUS FOR COLOR SYNTHESIS

I. TECHNICAL FIELD

The invention relates to a method and an apparatus for color synthesis by optical mixing of colors and varying the relative intensity of at least one of the colors for the purpose of producing a plurality of hues over the spectrum.

The expression, "optical mixing[, used herein, refers to nonphysical color mixing in which transparent filters are disposed in beams from light sources and the colored light beams are made to interact with one another by superimposition. Several filters can be arranged one behind the other in one and the same beam (known as "subtractive color mixing"), or else the light rays passing through individual filters are projected onto an at least partially common surface (known as "additive color mixing"). Details on this kind of color science are contained in physics textbooks, and therefore there is no need to discuss it further at this point. "Optical mixing" includes combined mixing methods, i.e., subtractive and additive color mixing can be done successively on sections of the beam, but this will be discussed further below.

II. STATE OF THE ART

In the science of color up to the present, three primary colors have always been used and brought selectively into interaction with one another. The primary colors, blue, yellow and red, are regularly used (cf. Gerritsen's book, "Farbe", 1975 Otto Maier Verlag, Ravensburg). The technical application of the three-color theory, however, is complex and always requires three separate systems to control the local distribution of the color components including their relative intensity (saturation). This applies to optical systems (color television for example) as well as to printing processes, the color black being generally added in printing processes in order to counteract the so-called graying effect.

Attempts have also been made to use two beams or two different filters of which only one is a color filter to influence the color characteristic of projected images, both arranged in the one beam. By means of the second beam, a colored field is then projected—a so-called "antidiapositive" whereby the subjective perception of color is altered (German Federal OS No. 16 22 975). Aside from the fact that processes in the human eye and brain play a fundamental role, important parts of the color spectrum fail to be reproduced by such a method or by an apparatus corresponding thereto.

III. PROBLEM TO WHICH THE INVENTION IS ADDRESSED

The invention is therefore addressed to the problem, in the above-described method of color synthesis, of considerably reducing its complexity, while nevertheless producing a plurality of hues distributed over the spectral range. At the same time, subjective influences such as surrounding field and simultaneously projected contrasting or complementary colors are to be avoided.

IV. EXPOSITION OF THE INVENTION

The solution of the stated problem is accomplished in accordance with the invention, in the process described above, by using exclusively two colors. One of these colors, "red-violet", has, in the spectral range between about 300 and 580 nm, an intensity or transmission maximum between 370 and 460 nm, and a minimum between 540 and 580 nm, and beginning from this minimum the transmission curve first rises steeply, up to about 620 nm, to a value of the order of magnitude of the maximum, and from there it continuously rises less steeply into the infrared range above about 780 nm. The other color, "green", has, in the spectral range between about 300 and 660 nm, a transmission maximum between 520 and 560 nm and a minimum between 640 and 670 nm, and, beginning from this minimum the transmission curve rises substantially continuously to a transmission value which, at 750 to 770 nm, lies approximately in the range of the maximum.

Figure 2:
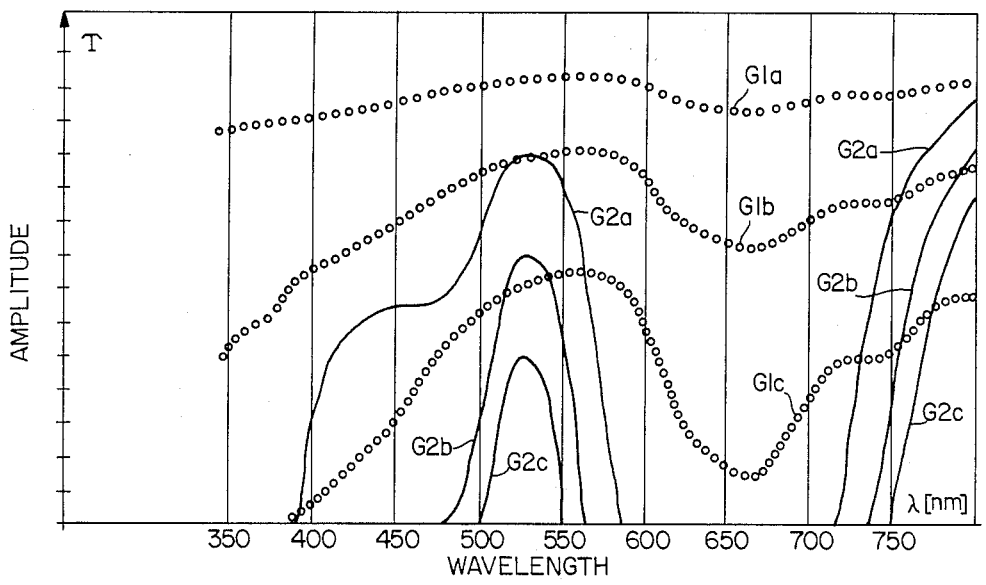

By these data, which find their support in the diagrams in FIGS. 1 and 2, dyes of very specific spectral characteristics are defined, which, in dissolved form or in the form of ultrafine pigments which cause no appreciable light diffusion, are applied in a transparent binding agent to a filter base. It is likewise possible for such dyes to be contained in a filter base in homogeneous or quasihomogeneous distribution, as is done in the case of glass or plastic films dyed in the mass.

The following will be examples for the above purpose: "Red-violet": A red-violet from the group of the quinacridone dyes; Hostasol Red 5B, a fluorescent dye sold by Hoechst AG under the designation 19809 EFBK 305; "Purple Red No. 1997/350" according to the French standard NF S 51204 as a glass color (couleur vitrail) sold by Lefranc & Bourgeois in Le Mans, France. In spite of the name it is "red-violet" in accordance with the specification of the invention (diagrams). An excellent filter can be made from the dye by casting it on a glass sheet. "Green": Chrome oxide hydrate—Chrome oxide hydrate, also called chrome oxide green, is established by DIN standard 6164, and has the chemical formula $Cr_2O(OH)_4$.

Surprisingly, it has been found that, with only the specified colors, the entire spectrum can be covered by optically mixing the colors subtractively and/or additively. For example, the colors red-violet, blue, blue-violet to green and yellow-green are produced subtractively, while the colors white, yellow, cyan and magenta can be produced additively.

If colors are used which lie markedly below the above-specified spectral characteristic, the effect in accordance with the invention no longer occurs. For example, an experiment with a subtractive color mixture using a red-violet filter in accordance with the invention with a green film that does not comply with the spectral specification, produces only a dirty brown, while the use of a filter with the green in accordance with the invention results in a luminous blue. On the other hand, a subtractive color mixture of a green filter which corresponds to the spectral specification (curves G2a-G2c of FIG. 2) and is obtained from a different pair of television stereo spectacles, in combination with its partner film (red) shows black, i.e., absolute opacity, which corresponds exclusively to the purpose of the stereo spectacles.

The colors in accordance with the invention, in the form of color filters, are suitable for forming an image within a limited picture field by the locally different mixing of several colors and local variation of the relative intensity or saturation of at least one of the two colors.

This can be achieved to special advantage by passing a light beam successively through two filters with the colors "red-violet" and "green", which filters overlap at least in portions of the picture field, and by capturing the colored light rays emerging from the filters on a common projection surface with additive color mixing.

This "succession" can be accomplished not only by arranging two filters in series at the same location (known as subtractive color mixing), but also by succession in time by passing the light beam by transverse deflection through a corresponding combination filter, doing this so fast that the human eye perceives the recombined light pulses as additive color mixing. In this case deliberate use is made of the effect that also the projection of colored light beams onto directly adjacent surfaces represents, for the human eye, an additive color mixing if only the individual dots of color are sufficiently close together and are sufficiently small in proportion to the distance from the observer. This effect is widely utilized in the picture tubes of color television receivers, for example.

At the same time it is especially desirable to arrange a plurality of equal filter groups in regular distribution in the picture field and in the same alignment, and to scan these filter groups with the light beam in rapid succession.

The picture field is then divided into an extremely great number of filter groups of very small dimensions, so that a picture structure of sufficient sharpness of detail will be possible. The scanning is performed by a periodically deflected light beam; the deflection frequency should amount to at least 25 Hz in order to obtain a flicker-free picture. As it will be further explained in the detailed description, the path of the light beam relative to the locally differing filter characteristic is what determines the resultant color impression including color intensity, contrast and brightness.

At the same time it is especially advantageous to cause the light beam to oscillate across the seams between directly adjacent filters or filter groups and control the hue of the light beam emerging from the filter groups by varying the relative times of stay of the light beam in the individual filters or filter groups.

Another way of influencing the hue is provided by the further invention if the light beam emerging from the filter groups is varied by varying the beam cross section in proportion to the filter dimensions transversely of the light beam. The beam cross section can be influenced in a relatively simple manner by the state of focus of the light beam or by masks or diaphragms.

The invention also relates to an apparatus for the practice of the method described above, in conjunction with a light source for the emission of a focused light beam and the use of one of each of the color filters of the invention. Such an apparatus is characterized in accordance with the further invention by the fact that the color filters are constructed either as complementary step filters or as complementary continuous wedge filters. The expression, "complementary", signifies that the two filters are combined geometrically such that their common envelope surface forms a parallelepiped.

A picture screen in this case can be constructed by making a plurality of such filter groups in strip form and mounting them in an arrangement of lines behind a projection surface.

The light beam can be, in an especially advantageous manner, a so-called laser light beam.

In the picture-making art (still photography, motion picture photography, television) numerous cases are imaginable in which no neutral or "objective" reproduction of the photographic object is to be made. Either errors are deliberately produced in the technical set-up, so-called "tints" are corrected, or deliberate distortions are introduced for the achievement of special effects.

For example, the color temperature of artificial light as produced by halogen lamps is between 3000 and 3500 K. Artificial-light color films are consequently set for a color temperature of, for example, 3200 or 3400 K. The corresponding standardized values for daylight film are between 5000 and 6000 K, the color temperature of daylight being within the vary wide range of 4000 to about 8000 K, depending on the time of day and cloud cover. A film that is not correct for the color temperature can be adapted to it by using so-called conversion filters, which, however, permit adaptation only within narrow limits. The color temperature of an electronic flashgun is within the range of standard values for daylight film, so that if these films are used no conversion filter is used with them.

The use of a "wrong" color film with regard to the color temperature of the lighting conditions leads to the generally known effect that pictures made by artificial light on daylight films result in decidedly yellowish photographs, while pictures taken by daylight on artificial-lighting film will result in decidedly bluish photographs. These are so called "special effects," which in any case have only rare applications.

Another peculiarity that occurs in time-exposures of color films of all kinds is the so-called "Schwarzschild" effect: long exposures shift the color characteristic of the film into the blue-green or green, so that such photographs generally are not at all usable.

The filters known heretofore permit correction only within very narrow limits, and it is not until the photographs are finished that it is found that the color correction was not adequate or worked in the wrong direction.

It is therefore the further object of the invention to make possible by the use of the same dyes to achieve a correction over virtually the entire color temperature range in question, between 2000 and about 8000 K.

The solution is achieved by the further invention in that the area proportions of only two transparent or reflective color surfaces (R and G) are selected in predetermined ratios between 0 and 100% or between 100 and 0%, respectively, and the color surfaces (R and G) are disposed in at least one reference surface (F).

In other words, the object is to control light either simultaneously or successively with colored surfaces of predetermined magnitude distribution and/or saturation.

A surface percentage of 0% or 100% means that in each case only one of the two colors is present. Thus, for light-mixing purposes two color surfaces are needed, which then are also located in two reference surfaces, and in each case fill out the entire reference surface. If the surface magnitudes and color saturation are identical, the result of a light mixture will thus be white or neutral light. The light mixing can be performed simultaneously by superimposed projection or superimposition, or, in the case of motion picture photographs of static subjects, also by successive lighting. It thus becomes possible by varying the relative percentages of the luminous flux to produce shifts of the overall effect towards "red-violet" or "green." As a rule, however, the relative intensity percentages will not be selected substantially beyond 30% or 70% (or vice-versa).

If two such monochromatic filters are used in two different reference surfaces and the beam paths are aligned at a relatively great angle to one another, colored shadows will of course form behind the object being illuminated, which will correspond each to the other filter color. This effect can be markedly reduced by bringing the two beam paths very close together; the phenomenon, however, will basically persist, and this can be very undesirable and lead to special effects.

If it is desired to achieve an extensive or virtually complete light mixture, it will be advantageous in accordance with the further invention to proceed by disposing the R and G color surfaces with area percentages between 5 and 95% and 95 and 5%, respectively, in frequently alternating arrangement within a single reference surface. The division of the surface can be made in basically any desired manner; examples are further explained in the detailed description of the invention. At the same time it is especially advantageous to arrange the R and G color surfaces in a grid-like distribution on a single reference surface.

Neither is the invention limited to the construction of the light mixing apparatus as a filter; indeed it is also possible to construct the light mixing apparatus as a reflector, for example as a reflector for artificial light sources, or even as a reflector for sunlight. Such reflectors are often used outdoors, for example, for so-called "fill lighting".

Lastly, the apparatus of the invention can, in an especially advantageous manner, be combined with a light source, for example as a filter mask for a trough light, a floodlight or spotlight. The range of variation which this offers will be further discussed in the detailed description.

The finer this grid is, in the case of a grid-like distribution of the color surfaces, the more uniform the light mixing will be, i.e., the better colored shadowing will be avoided.

The light mixing apparatus of the invention in that case, if the color surfaces are disposed in an alternating arrangement within a single reference surface, can be designed as a single two-color filter and used as a filter mask not only for light sources such as electronic flashguns, for example, but also for photographic cameras. Individual, defined two-color filters can be provided, whose red-violet content decreases in steps from filter to filter—for example in steps of 5%, while the green content increases in equal steps of, for example, 5%. For each of these filters it is then possible to specify by how many Kelvins the color temperature changes up or down from a reference value or measured value. This leads to the creation of stepped filters which can be selected according to the desired effect. With a finer gradation than 5% and a larger number of filters it becomes possible to correct or even to deliberately distort virtually any color temperature. For example, a color temperature of, say, 8000 K, which corresponds to a blue or cloudy sky, can be corrected to the standard value of 5500 K for daylight camera film. The result will be photographs corresponding to a bright sky instead of the slightly bluish photographs that would otherwise be obtained.

Professional photography can also profit by the invention, for it is possible within an extraordinarily wide range to adjust the color temperature of the finished photograph to the desired value, in some cases even on the way from the negative to the paper print. As it will be shown further below with the aid of an example, it is even possible to produce within one and the same scene locally different color characteristics, without the need for any more than the two characteristic colors. The control achieved in photographic products is especially important also in the production of layouts or printing masters, because it makes it possible even at the very end to eliminate an undesirable tint.

The correction value peculiar to the color mixing apparatus can be expressed in K (Kelvin) in a table or marked directly on the light mixing apparatus, so that it is possible by using one of the commercial color temperature meters (e.g., Minolta, model: COLOR-METER II) to immediately select the proper light mixing device. Even the filter factor by which the exposure must be lengthened with reference to an exposure without filter can be directly marked on the filter in a known manner, so that the photographer (or lighting director), for example, will have all the information available that is needed for the selection of the necessary filter.

The subject matter of the invention has also been successfully tested in so-called "time exposures" in which the Schwarzschild effect described above occurs. These are exposures ranging from several minutes to as much as an hour. If in this case the proportion of "red-violet" in the total exposure is 33% and the proportion of "green" is 67%, it is possible even in nighttime photography to produce photographs giving the impression of daylight. This is surprising inasmuch as a longer exposure time had to be used to compensate for a filter factor amounting to about F=4, so that it would be expected that the Schwarzschild effect would be intensified.

It is furthermore to be pointed out that the transmission curves defined in Claim 1 characterize only the dye itself, i.e., the measurements were made by means of a filter. However, if dyes identified in this manner are used in reflective color surfaces, the results indicate how they are employed in the "fill-in" reflectors described above.

Additional advantageous developments of the subject matter of the invention will be found in the rest of the subordinate claims.

V. INDUSTRIAL UTILITY

The method and the apparatus of the invention are suitable for a great number of color processes, such as printing paper processes, photographic processes, image transmission processes, radiophotography, video receiving processes, duplicating processes including copying processes, projection processes, video conversion processes, and for electronic and electromechanical color analysis, and lastly for lighting and illumination arts including studio lighting for photography, motion picture and television production.

VI. BRIEF DESCRIPTION OF THE DRAWINGS

The invention will be further explained below with the aid of FIGS. 1 to 32.

Figure 5:
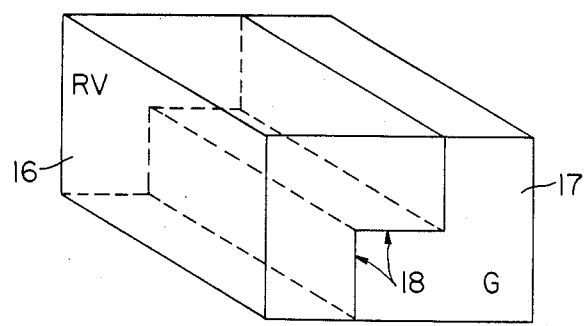
Figure 6:
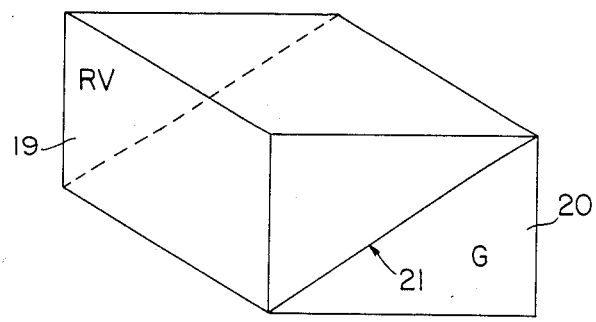
Figure 7:
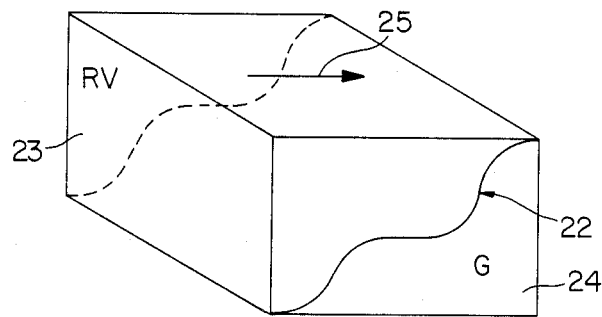
Figure 8:
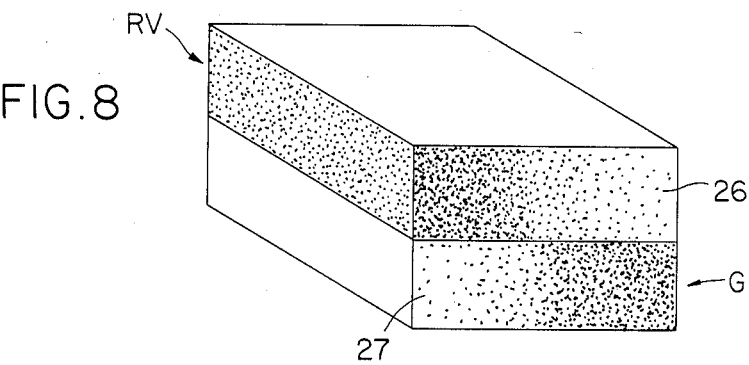
Figure 12:
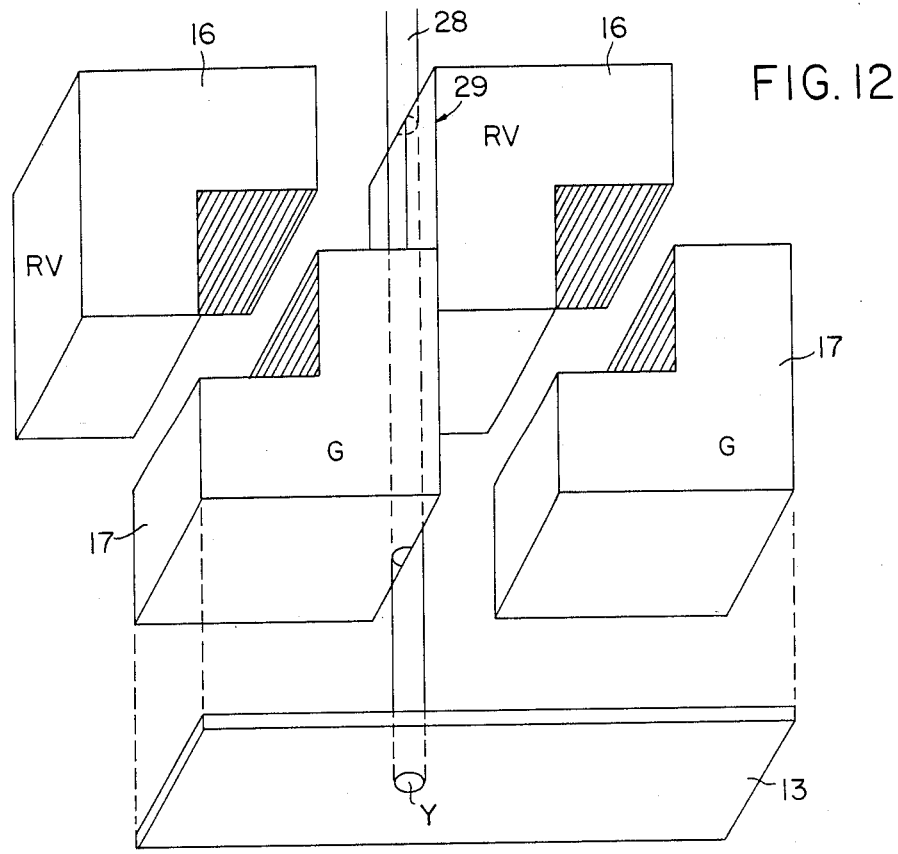

FIG. 1 is a diagram of the spectral transmission T of filters of the color "red-violet", FIG. 2 is a similar diagram of filters of the color "green", FIG. 3 is a diagrammatic representation of an apparatus for the practice of the color synthesis in accordance with the invention, having two light sources disposed at an angle to one another, FIG. 4 shows a filter arrangement in different positions relative to a beam, for use as a correction means in color projection, FIG. 5 shows a filter group which is composed of two L-shaped, complementary individual filters, FIG. 6 shows a filter group which is composed of two wedge-shaped individual filters, FIG. 7 shows a filter group with a wavy interface between the individual filters, FIG. 8 shows a filter group composed of two plane-parallel plates which have a varying degree of density on the basis of a special incorporation of color in the mass, FIGS. 9 and 10 are exploded representations of a filter group of FIG. 5 together with a light beam indicated at various positions, and a projection surface for the observation of the color synthesis, FIG. 11 is a representation similar to FIG. 5, but showing the spatial relationship of different light beams and the spectral colors of the light beams emerging from the filter group, FIG. 12 is an exploded representation of two directly adjacent filter groups in accordance with FIG. 5.

Figure 13:
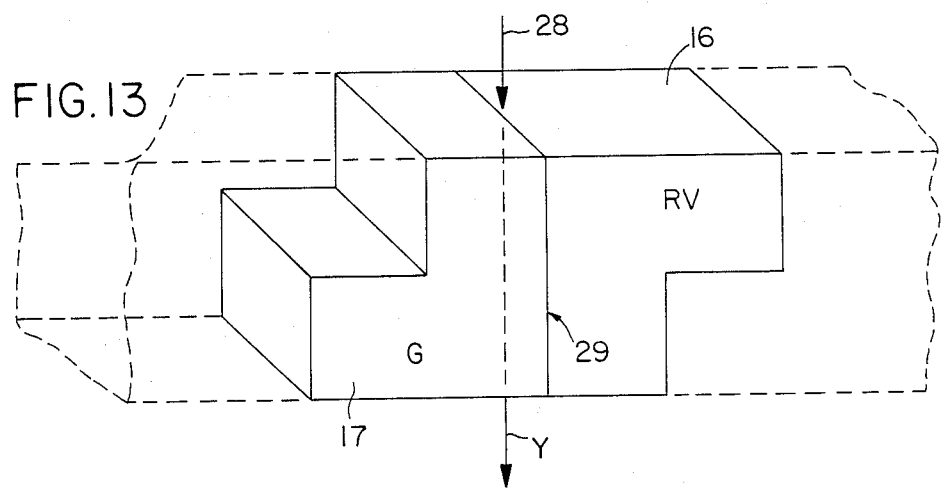
Figure 14:
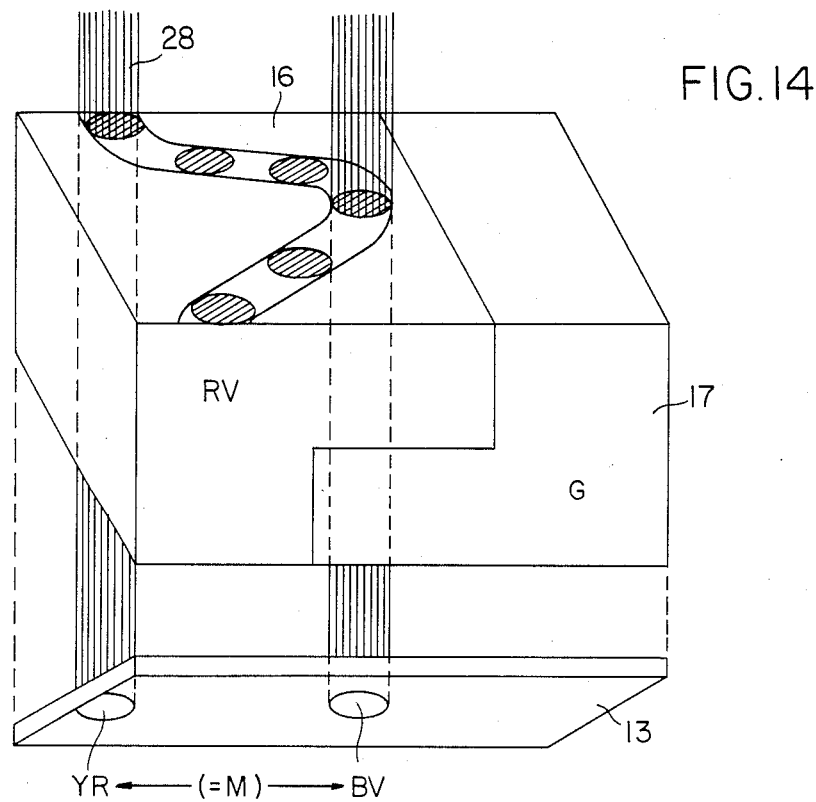
Figure 15:
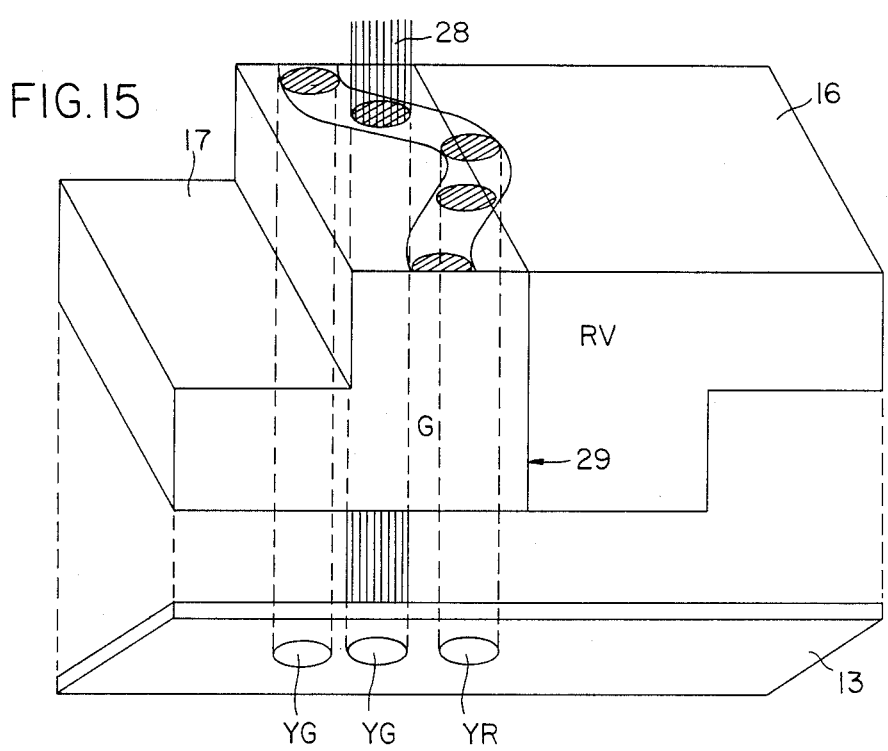

FIG. 13 shows the assembled, directly adjacent individual filters of FIG. 12,

FIG. 14 shows a filter group in accordance with FIG. 5 with a light beam that moves with oscillation through the individual filters, accentuating two different beam positions, FIG. 15 shows a filter arrangement in accordance with FIG. 13, with a light beam oscillating over the seam between the two directly adjacent filter groups, accentuating three different beam positions, FIGS. 16 to 18 show multiple arrangements of the filter group of FIG. 14 with the various possibilities for controlling the color characteristic, FIG. 19 shows a multiple arrangement of the filter group in accordance with FIG. 8, with the various possibilities for controlling the color characteristic, FIGS. 20 to 27 show multiple arrangements of the filter group of FIG. 6, with the different possibilities for controlling the color characteristic.

Figure 28:
Figure 29:
Figure 30:
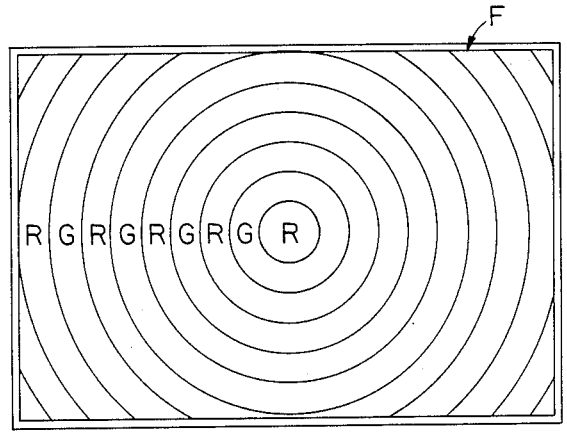
Figure 31:
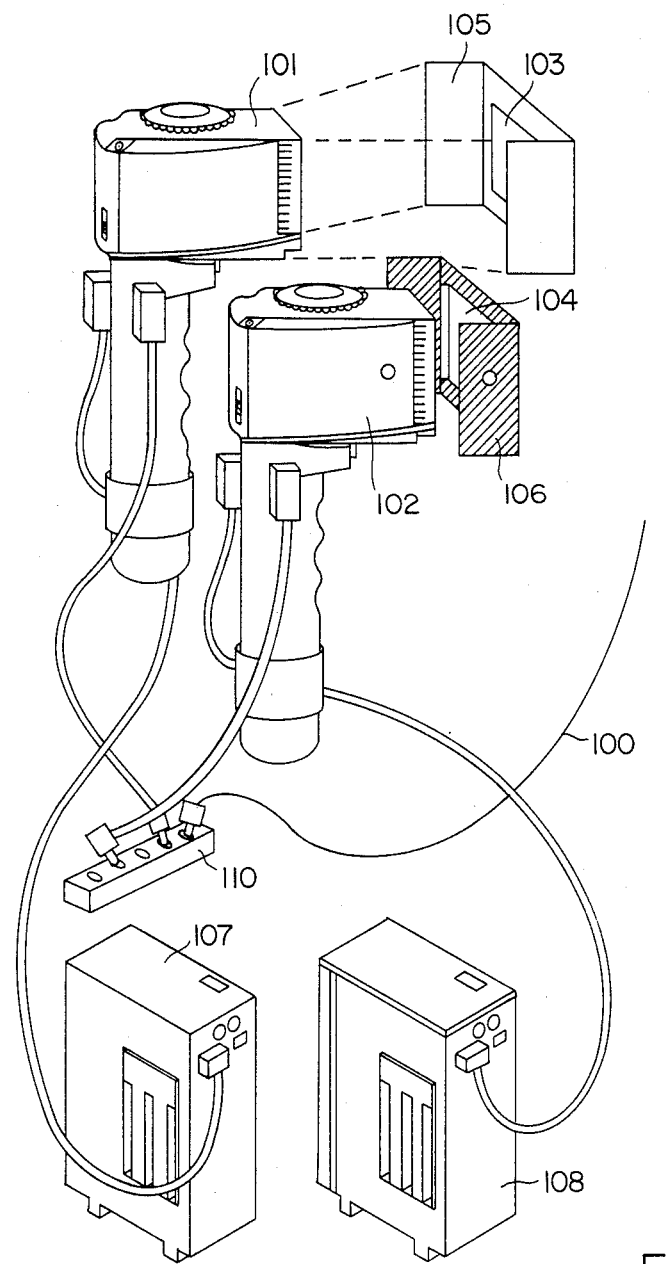
Figure 32:
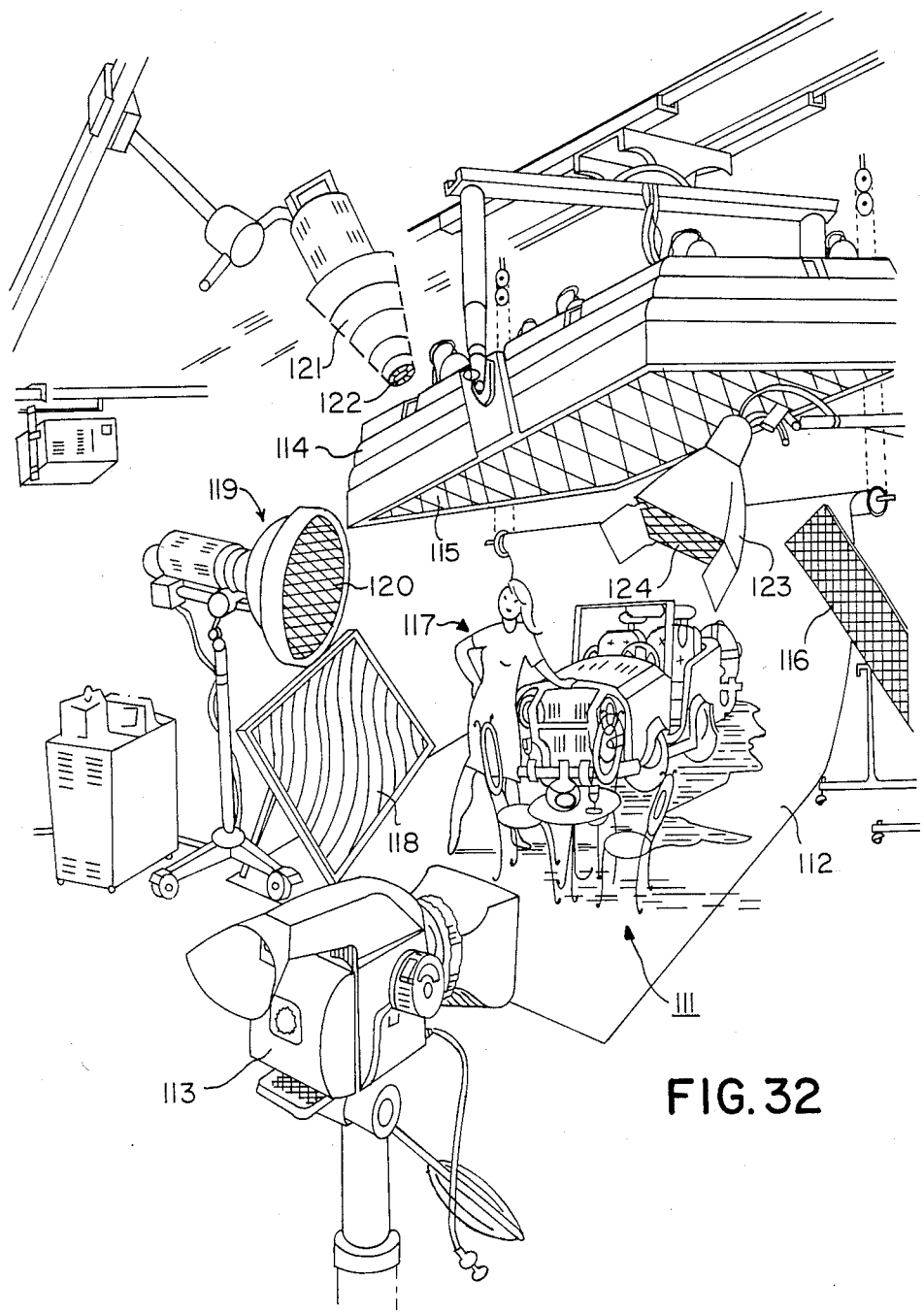

FIGS. 28 to 30 show various possibilities for dividing the individual color surfaces within a single reference surface, FIG. 31 shows the possibility for use on electronic photoflash apparatus, and FIG. 32 shows various possibilities for the use of light mixers in accordance with the invention in photographic recording under "studio lighting".

VII. WAYS OF REALIZING THE INVENTION

In FIG. 1, small rings represent a transmission curve R1 indicating the transmission values across the spectrum of a medium-density color filter of the hue "red-violet", namely across the spectral range between about 300 and 800 nm. The curve, like the rest of the curves, was recorded by a spectral photometer made by Perkin-Elmer, Model 402, "Ultrawide-H Visible". This filter is a cell filled with a quinacridone dye dissolved in turpentine. The solid curves R2a, R2b and R2c were plotted with the above-described dye, Hostasol Red 5B, which was dissolved in various concentrations in acetone and analyzed in a cell. Turpentine and acetone were placed in a second cell in a reference beam of the photometer and their spectral readings were subtracted in the computer.

The broken curves R3a and R3b were recorded with an acrylic film as color filter (Roehm & Haas, Darmstadt; ROEHM 520 Plexiglas Red-Violet), which had been colored in the mass. The greater density for curve R3b was achieved by doubling the film. A colorless film of the same plastic was placed in a reference beam of the photometer and likewise "subtracted" mathematically.

It can be seen that the curves in the spectral range between about 300 and 580 nm have transmission maxima between 370 and 460 nm and minima between 540 and 580 nm. Beginning from these minima, the transmission curves first rise steeply up to about 620 nm to a level that is of the same order of magnitude as the previously described maxima. From here on the curves rise less steeply into the infrared range above about 780 nm. In the event of a change in the density or color saturation of the samples, the result was only a shift to higher or lower transmission levels, but the distinctive pattern of the curve, including the location of the maximum and minimum, remained substantially the same.

In FIG. 2, two groups of three transmission curves each, G1a-G1c and G2a-G2c, are represented. The recording of the curves G1a-G1c characterized by small rings was performed by means of glass plates coated with a film containing chromic oxide hydrate as the coloring pigment, which is sold as a pigment powder under the designation 18507 by the firm of Schmincke (name: Chromoxidgruen-feurig" [=fiery green chromic oxide]). Here again the density and color intensity of the filter was varied by the thickness of the coating. The recordings of the solid curves G2a-G2c were obtained by means of a green film made by Zeiss, which is used in video stereo spectacles, with one, two and three layers of the film. It was found in all of the curves that, in the spectral range between about 300 and 660 nm, transmission maxima are present between 520 and 560 nm and minima between 640 and 670 nm. Beginning from these minima the transmission curve rises rather steadily to a value which is about within range of the maxima at 750 to 770 nm. Here, too, the characteristic locations of the maxima and minima are present in all transmission curves in a similar manner.

The apparatus of FIG. 3 has two light sources 1 and 2, with each of which is associated a reflector 3, a condenser 4 and an objective lens 5, so that two divergent, focused light beams 6 and 7 can be produced. The two light sources 1 and 2 form with the corresponding optical elements the optical axes A1 and A2 which are at an angle to one another amounting, for example, to 60 degrees. In the vicinity of the light source 1, or, more precisely, between the condenser 4 and objective 5, there is a first green filter G1, while in the vicinity of the second light source 2 there is a first red-violet filter R1. Thus two colored beams are produced which are aimed at an at least partially common surface 8 which is disposed in an opaque wall 9.

In this surface there are two framed openings 10 and 11 in which a second green filter G2 and a second red-violet filter R2 are disposed, the second green filter G2 being on the side of the light source 1 with the first green filter G1, while the second red-violet filter R2 is on the side of the light source having the first red-violet filter R1.

The light sources 1 and 2 are controlled for brightness, e.g., by brightness controls or by a variable gray filter, for the purpose of altering the color characteristic.

The ratio of the optical densities of the first green filter to the second amounts to at least 2:1, and the ratio of the optical densities of the first red-violet filter to the second amounts to no more than 1:6.

As it can be seen in FIG. 3, the two beams 6 and 7 overlap on the entire area of the second red-violet filter R2, and, in the area of the second green filter G2, they overlap on about half of the side adjacent the second red-violet filter R2. The restriction of the green beam 6 can be accomplished either by a mask in the plane of focus of the objective 5, or by an external mask 12 in the beam path.

Parallel to and at a distance "d" from the common surface 8 there is disposed a projection surface 13, the distance "d" being selected such that the colored light rays emerging from the second filters G2 and R2 will partially overlap. This overlapping is clearly seen in FIG. 3. In the manner described, a subtractive color mixing is performed up to the back of the filters G2 and R2, while on the rest of the way to the projection surface 13 an additive color mixing takes place. The projection surface 13 consists preferably of a ground glass, so as to permit convenient observation of the color spectrum from the back. The result is the production of the spectral colors identified by abbreviations (from left to right): blue-violet - cyan - yellow-green - yellow - orange-red - red-violet. In the present connection as well as throughout the rest of the description, the abbreviations listed below will be used:

B=blue
BG=blue-green
BR=blue-red
BV=blue-violet
BW=bluish-white
C=cyan
G=green
M=magenta
O=orange
OR=orange-red
R=red
RB=red-blue
RO=red-orange
RV=red-violet
W=white
Y=yellow
YG=yellow-green
YR=yellow-red
YW=yellowish white The most favorable distance "d" can easily be determined by moving the projection surface 13 back and forth, as can the optimum angle between the optical axes A1 and A2. At the same time it is apparent that the magnitudes given are not critical as long as certain ranges are not exceeded.

In FIG. 4 there is shown a frame-like mounting 14 in which a green filter G and a red-violet filter R are disposed, each filter being square. A beam 15 from a light source not shown is defined by a circle, the portions of the filter that are inside of this beam being represented by hatching. The vertical hatching represents the color red-violet, the horizontal hatching the color green.

Figure 4A:
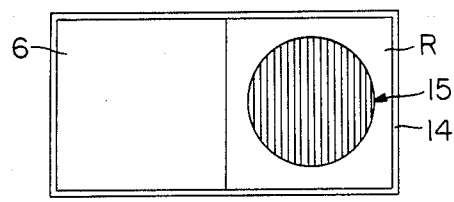
Figure 4B:
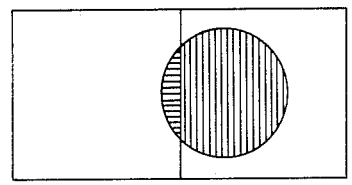
Figure 4C:
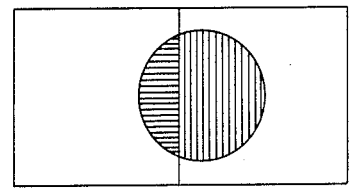
Figure 4D:
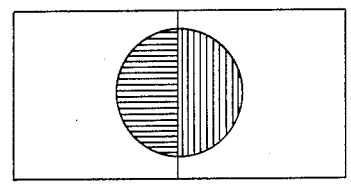
Figure 4E:
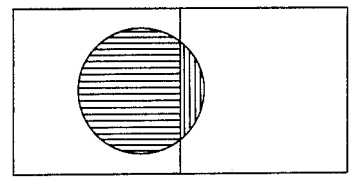
Figure 4F:
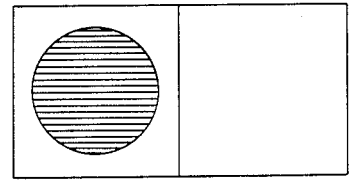

In FIG. 4a, only the red-violet filter is in the beam path 15, so that a red-violet beam is also produced. If the density of this filter is very great, the impression of red-orange develops, so that the color characteristic can be controlled especially in the red-violet filter by its density. If now the filter arrangement is shifted from the position indicated in 4a increasingly to the right to the position 4f, the proportion of the red-violet filter that is in the beam path 15 diminishes, and the proportion of the green filter in the beam path increases, until finally only the green filter is in the beam path 15 (FIG. 4f). Since an additive mixing of light again occurs in the beam, white light is formed in the middle position at 4d, in which the proportions of the two filters that are in the beam path are equal. The effect of this can easily be followed by observing so-called color circles in the beam. Thus, starting from a neutral state corresponding to the filter setting of FIG. 4d, the color characteristic can be influenced both ways, i.e., both in the direction of "warmer" colors and in the direction of "colder colors", all the way to a complete "distortion" of the colors in the two opposite end positions in FIG. 4a and 4f, respectively. The apparatus in question can be used as a correction device in color projection, and also as a correction filter in the production of colored photography or in the reproduction of colored models.

FIG. 5 shows the structural combining of a red-violet filter 16 and a green filter 17, both of which have an L-shaped cross section and are of complementary shape so that in the assembled state they form a parallelepiped. The interface 18 between the two filters is stepped, so that the filter assembly can also be called a "step filter". Thus, the red-violet filter 16 has two zones of gradated permeability or color saturation which are in a ratio of 1:2 to each other. This applies analogously to the green filter 17. The optical effect of such a filter assembly will be explained further on.

In the filter group in FIG. 6, both the red-violet filter 19 and the green filter 20 are in the form of a wedge-shaped filter, while the envelope surface of the filter group again encloses a parallelepiped. The interface 21 is planar.

In the filter according to FIG. 7, the interface 22 between the red-violet filter 23 and the green filter 24 is of a wavy shape. In this manner it is possible to control the timing and placement of the color characteristic, for example, if one imagines a light beam that is running through the filter of FIG. 7 in the direction of the arrow 25.

FIG. 8 represents a filter group which consists of two parallelepiped filters, namely a red-violet filter 26 and a green filter 27. To achieve an effect analogous to that of the filter groups of FIGS. 6 or 7, the material of the filter 26 and of filter 27 is colored with varying intensity: in the upper, red-violet filter 26 the zone of greatest color saturation is on the left, while in the green filter 27 the zone of greatest color saturation is on the right.

FIGS. 9, 10 and 11 show, partially in an exploded view, a filter group of FIG. 5 and its effect. In FIG. 9 a light beam 28 is represented in three different positions. In the left position it passes through the red-violet filter 16 at the location of its greatest density, so that the hue orange or yellow-red (YR) is produced on the projection surface. In the middle position the light beam penetrates the thinner part of the red-violet filter 16 and the likewise thinner part of the green filter 17, so that, on the basis of subtractive color mixing, the hue blue-violet (BV) appears in the projection surface 13. In the position on the right, the light beam passes only through the thickest part of the green filter 17, so that the hue yellow-green (YG) appears in the projection surface.

FIG. 10 shows the light beam 28 in a shifted position. In the left position half of it passes through the thickest part of the red-violet filter 16 and the other half through the thinnest part of this filter as well as the thinnest part of the green filter 17. Thus the light beam 28 undergoes a subtractive color mixing on half of its cross section, so that, after additive color mixing with the other half of the light beam, the hue red-violet will result. In the position shown on the right, one-half of the cross section of the light beam passes through the thinnest part of the red-violet filter as well as the thinnest part of the green filter 17 (subtractive color mixing) and the other half of its cross section passes only through the thickest part of the green filter 17. By additive color mixing, the hue blue-green (BG) appears now in the projection surface 13.

FIG. 11 shows the combined filters 16 and 17 in conjunction with the location of the light beam and the color characteristic at the output end of this light beam.

FIG. 12 shows a double arrangement of two filter groups in accordance with FIGS. 9 and 10, respectively, but in this case only the conditions prevailing in the area of the line of separation 29 are of interest. Along this line of separation, one half of the cross section of the light beam 28 passes both through the thickest part of the green filter 17 and the thickest part of the red-violet filter 16. On account of additive color mixing in the projection surface 13, the hue yellow (Y) is here produced. FIG. 13 shows only the two directly adjacent filters in conjunction with the light beam 28 passing through them at the line of separation 28.

FIG. 14 shows a filter group in accordance with FIG. 11 in which the light beam 28 is carried through the filter group according to a selectable time-coordinate program. In this case the hue is affected by different relative times of stay of the light beam 28 in the individual filters 16 and 17. If the rate of displacement of the light beam 28 is the same, the time of stay of the light beam is proportional to the distance which the light beam covers simultaneously in the one or other filter or in both filters, e.g., in the area of the thinnest sections of the two filters. In the left position, the light beam passes only through the thickest part of the red-violet filter 16, while in the right-hand position it passes both through the thinnest part of the red-violet filter 16 and the thinnest part of the green filter 17. In accordance with what has been stated thus far, the result will be light beams in the projection surface 13 with the color characteristic yellow-red (YR) and blue-violet (BV). By additive color mixing in the projection surface 13 (close adjacency or superimposed projection of the light beams), a color will thus develop whose overall characteristic will correspond to the relative portions of the time of stay in the area of the two colors. In the present case the relative times of stay are selected such that the color magenta (M) is formed as a blend.

In FIG. 15 are represented the conditions in an arrangement such as that shown in FIG. 13. As long as the light beam 28 is running within the thickest portion of the green filter 17, the color yellow-green (YG) will appear on the projection surface 13. As soon as the light beam 28 crosses the line of separation 29, which happens in about the middle of its course, a portion of yellow-red (YR) will develop on account of the thick part of the red-violet filter 16 which is here present, so that the total color on the basis of the additive mixing in the projection surface 13 is a very bright yellow-green.

In FIGS. 16, 17 and 18 are shown different time-coordinate programs of the light beam 28 in conjunction with a multiple arrangement of filter groups such as those shown in FIGS. 14 and 15. In the case of a less sinuous path of the light beam, in FIG. 16, a high color saturation occurs and the hues blue-green (BG), yellow-red (YR), blue-violet (BV), yellow-green (YG), blue-red (Br) and blue (B) form on the projection surface 13, from left to right.

Figure 24:
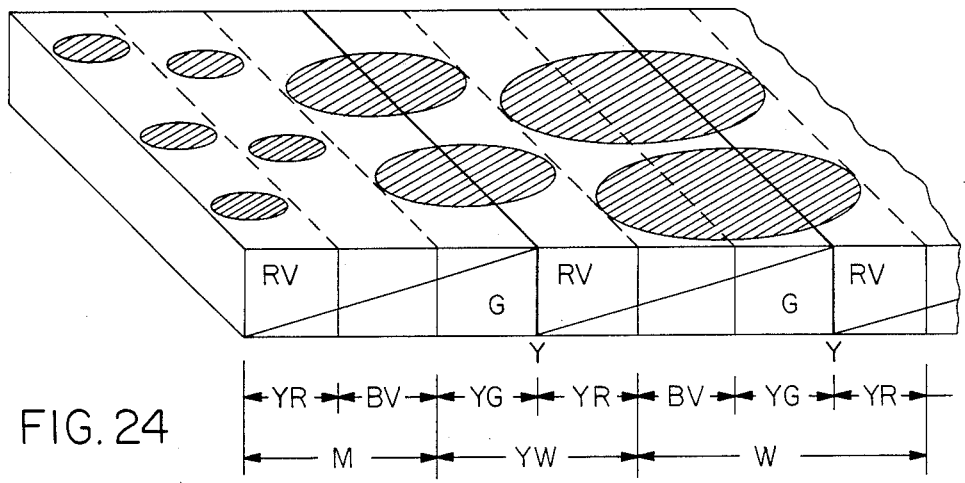

If the horizontal deflection of the light beam 28 is increased as represented in FIG. 2, there will be a lesser color saturation and a greater color brightness in the projection surface 13 (similar conditions can also be achieved by giving the light beam a greater cross section, as will be explained further on in conjunction with FIG. 24). In the manner described, the following hues are produced on the projection surface, from left to right: magenta (M), yellow (Y), cyan (C) and orange (O).

In FIG. 18, the light beam 28 is represented with a still greater lateral deflection than in FIG. 17. In this case a very low color saturation results, so that the perception of brightness predominates. In this manner the following hues are produced: white (W), yellowish white (YW), bluish white (BW) and reddish white.

In FIG. 19 the circumstances are represented which will result in the case of a multiple arrangement of a filter group in accordance with FIG. 8 if the light beam 28 is shifted accordingly or moved according to a time-coordinate program. On account of the arrangement selected, the following colors appear on the projection surface: yellow-red (YR), blue-violet (BV), yellow-green (YG), yellow (Y) and blue-green (BG). It can also be seen here that in the area of a seam 29 between adjacent filter groups, when a light beam 28a strikes with half of its cross section on a filter group, the color yellow (Y) results.

With the aid of FIGS. 20 to 27, similar conditions involved in the use of so-called "blending filters" such as those represented in FIG. 4 will be explained. In this manner an even better-nuanced color synthesis can be achieved. In the cases described hereinbelow, the light beam, of which only the areas of impingement are represented by hatching, can be moved linearly. The relative portions of the individual color components can then be determined by the distance of the track of the light beam from the longitudinal edges of each filter group. The basic rule applies that the sharper the light beam is focused, the greater will be the color saturation.

Figure 20:
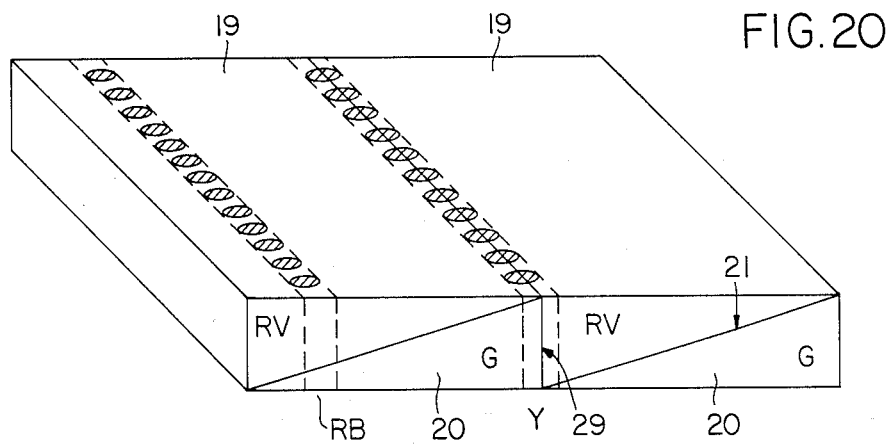

In the example given in FIG. 20, an extremely sharply focused light beam is involved, so that, on the basis of the position of this light beam with respect to the longitudinal edges of the filter groups the colors red-blue (RB) and yellow (Y) will be produced. It can be seen here, too, that the color yellow is formed in the area of the line of separation 29 between immediately adjacent filter groups.

Figure 21:
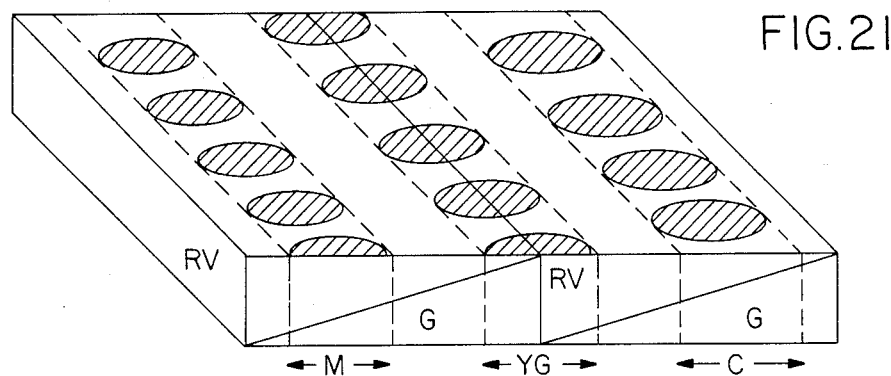

In the example in FIG. 21, the light beam is focused on a greater area, so that the color saturation diminishes accordingly. In this manner the following colors develop in the positions indicated (the repetition of the hatched areas indicates only the path of movement of the light beam): magenta (M), yellow-green (YG) and cyan (C).

Figure 22:
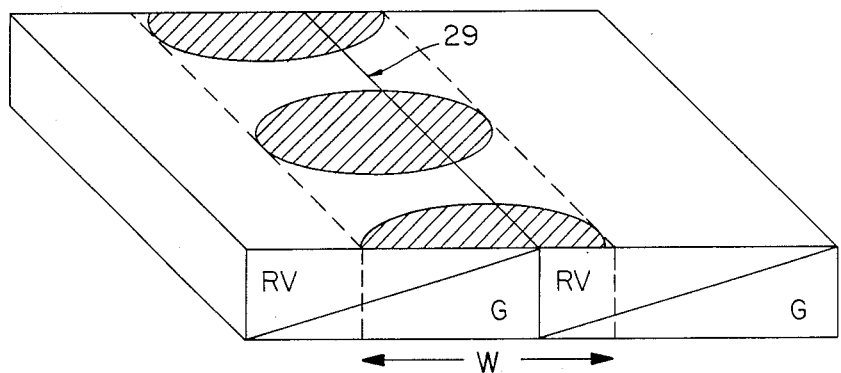

In the embodiment shown in FIG. 22, the focus of the light beam differs from that in FIG. 21 in that the area of impingement has been even more greatly enlarged. On the basis of the position of the light beam, especially in relation to the line of separation 29, the result is the color white (W). The color saturation is extremely low, and here again only a gradation takes place according to the brightness values. The different sizes of the light beam impingement areas are, of course, to be seen in relation to the width of the individual filter groups, as can easily be seen by comparing FIGS. 20 to 22. The differences in the size of the impingement areas can be produced not only by the sharpness of focus of the light beam or by a modified focal length of an objective lens that may be provided, but also and especially by the application of special masks which sharply separate a particular area from a large light beam. Such a mask can be applied, for example, in the plane of focus of a lens.

Figure 23:
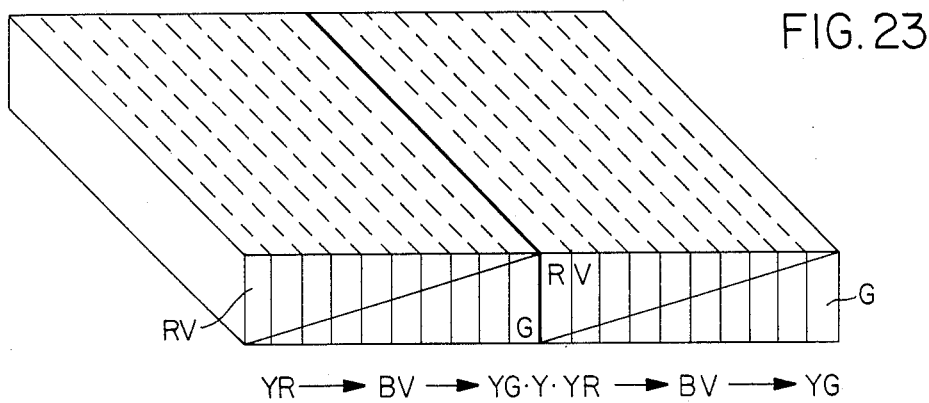

FIG. 23 explains the conditions in the scanning of one filter group in each of ten adjacent, equidistant paths which are to be thought of as lying between the longitudinal edges or between the broken lines. All of the spectral colors, from yellow-red (YR) through blue-violet (BV) to yellow-green (YG) and yellow (Y), are formed with high color saturation. If the scanning is reduced, in accordance with FIG. 24, to three or fewer lines per filter group, only the common three primary colors are obtained, but here again with the highest color saturation. These are the colors yellow-red (YR), blue-violet (BV) and yellow-green (YG), and, in the area of the dividing lines between the individual filter groups, the color yellow (Y). By additive color mixing on the way to the projection surface (not shown), this leads to the colors magenta (M), yellowish-white (YW) and white (W).

Figure 25:
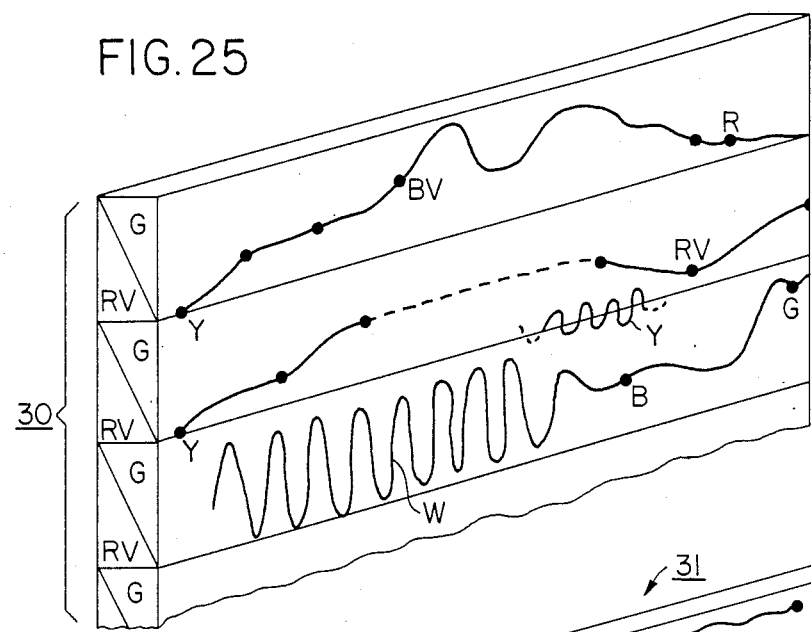
Figure 26:
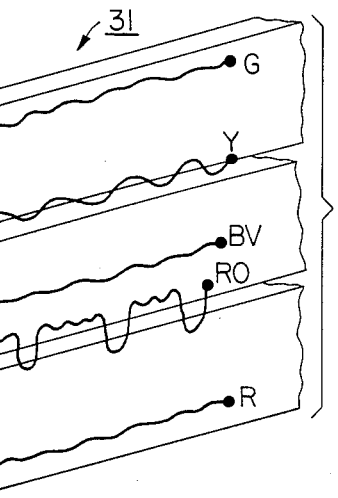
Figure 27:
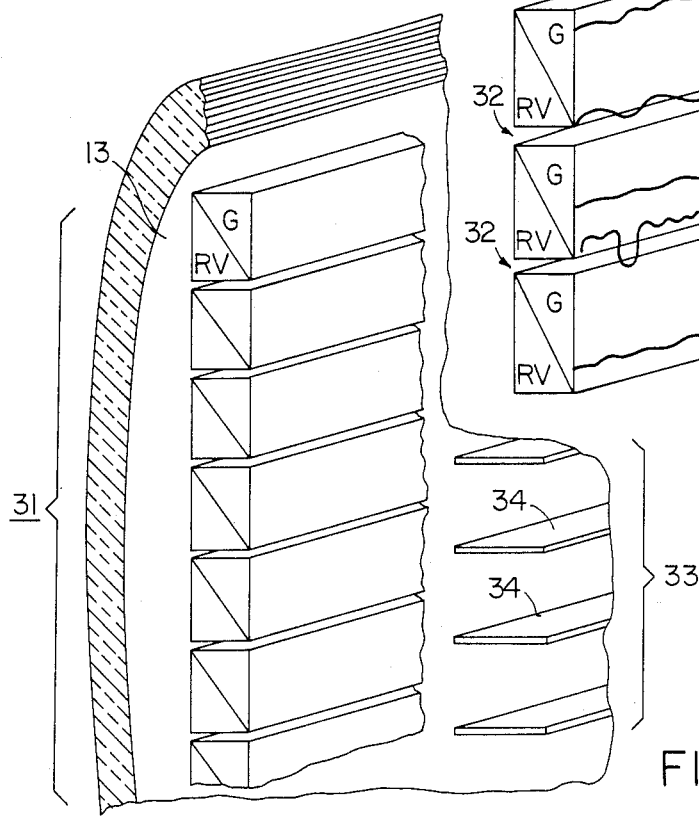

Lastly, FIGS. 25 to 27 show arrangements of a plurality of such filter groups, which are of linear configuration, in a linear arrangement 30 and 31, respectively. In the linear arrangement in FIG. 25, the individual filter groups are arrayed directly side by side, while in the linear arrangement 31 of FIG. 26 air gaps 32 are formed between the filter groups. In FIGS. 25 and 26, meandering paths of light beams are represented, along with the corresponding color characteristic. It is apparent here again that the color yellow (Y) is produced by an oscillating movement of a tightly focused light beam across the seams between adjacent filter groups. If a deflection occurs in the area of such a seam or air gap 32 only at great intervals apart, as shown in FIG. 26, the color red-orange (RO) can be achieved.

FIG. 27 also shows the arrangement of a line arrangement 31 in accordance with FIG. 26 behind a curved projection surface 13 which can be made in the manner of the screen of a television tube. Between the light source and the row arrangement 31 there is also disposed a light rectifier 33 which consists of parallel blades 34.

FIGS. 28 to 30 show light mixing devices having different layouts of the individual color surfaces, "R" representing the color "red-violet" defined in accordance with the invention, and "G" for the color "green" defined in accordance with the invention. Let it be assumed in all three cases that the color saturation or average transmission in the individual color areas R and G is identical. The proportions of the individual colors are consequently predetermined by the individual areas. It will be apparent that another possibility exists for affecting the color characteristic—within reasonable limits—through the color saturation or average transmission of the filter surfaces of the individual colors.

FIG. 28 shows an arrangement in which the color areas or surfaces R and G are in rows within a reference area F and each occupies 50% of the total area. In sum, therefore, equal proportions of red-violet and green light pass through the filter in FIG. 28. Depending on the focusing of the entire light beam, the individual light rays mix at a more or less great distance behind the filter and form the color "white". If such a filter is disposed, for example, in the aperture plane of a lens, no imaging of the filter structure will be produced, just as a diaphragm is not imaged as a hole.

In the light mixing device of FIG. 29, the individual color areas R and G are in different proportions, namely, R occupies 33% and G 67% of the total area. The light mixture resulting from the additive mixing of the light consequently has a color temperature toward higher degrees Kelvin. Conversely, of course, a larger percentage, of for example 67%, can be assigned to the R color areas, and 33% to the G color areas, so that the color characteristic of the mixed light is characterized by lower degrees Kelvin. With a color mixing means in accordance with FIG. 29, for example, a photograph can be made, for example, even in late afternoon, whose color tone will correspond to a photograph at midday with a radiant blue sky. In all cases it is assumed that daylight film is being used.

FIG. 30 shows a filter system with the same area proportions for R and G as in FIG. 28. The color areas, however, are alternated in the form of rings, but this does not result in any substantial difference from FIG. 28.

With a variant of the color mixing device in accordance with FIG. 30, however, an additional technical effect can be achieved: If, for example, the width of the individual rings is made to increase outwardly and/or different area proportions of R and G are provided, and such a filter is disposed in the diaphragm plane of a lens, it is possible merely by stopping down or up to achieve a color shift without requiring a change in the filter itself or a filter replacement. Such a color mixture could be used to special advantage in copying establishments, for example, for the production of paper copies.

The establishment of the relative area proportions can be achieved easily by using a light defined as neutral or white, and expanding or reducing one of the color areas at the expense of the other, until the desired color characteristic is achieved. This applies to filters as well as to reflectors. Alternatively, it is possible, as already described, to increase or reduce the transmission or color saturation of one of the areas at the cost of the other until again the desired color characteristic is achieved. Of course, both measures can be applied simultaneously.

The filters can be made of a material dyed or stained in the mass (glass, transparent plastic) or of a coated material, the coating being a binding agent and/or solvent with the dye dissolved or suspended therein, as commonly known in the production of filters. In photographic filters for cameras, attention must, of course, be paid to absolute freedom from diffusion effects, while in filters for light sources or in reflectors a diffusion effect may be entirely desirable.

The invention is suitable for the achievement of a great number of differentiable color temperatures, expressed in degrees Kelvin, with an absolute color balance, i.e., the maintenance of the relative gradation between all hues, both for differences in daylight, artificial light, nighttime, and in fill lighting under a given general illumination.

FIG. 31 shows two electronic flashguns 101 and 102, each associated with its own filter 103 and 104, respectively. Each of these filters is provided with a mounting 105 and 106 for mounting on the flashgun. The filters 103 and 104 can be, for example, monochromatic filters, filter 103 having the color "red-violet" only, and filter 104 "green" only in accordance with FIGS. 1 and 2, respectively. Aside from the possibility of different filter factors, the color temperature of the mixed light formed from the two flashguns can be controlled by the relative intensities of the two flashes. Methods for the control of such flashguns are known and therefore are not further explained here. The power supply for the flashguns 101 and 102 is provided by storage batteries 107 and 108, and their synchronous operation is produced by a connecting cable attached to a camera, which is not shown, and a distributor 110. On account of the lateral offset necessarily presented by the two flashguns 101 and 102, colored shadows are produced by the photographed object if it is three-dimensional and standing on a base or in front of a background.

If these colored shadows are to be avoided, the filters 103 and 104 must be replaced by filters in accordance with FIGS. 28, 29 or 30, while in such a case the two filters should be identical, at least with regard to the area-wise distribution of the individual color areas. In such a case a modified space effect can be produced by different light distribution at the two flashguns, without changing the color temperature of the mixed light.

Lastly, FIG. 32 shows different possibilities for the use of differently configured light mixing apparatus in accordance with the invention. Scenery 111 is set up in a studio in front of a seamless backdrop 112 for the purpose of making an advertising photograph. A camera 113 is provided for taking the picture. Above the scenery 111 is a large-area light trough 114 with a filter 115 that corresponds substantially to FIG. 28, except that the boundary lines between the individual color areas are approximately parallel to the diagonals of the filter. This is intended to show that the orientation of the boundary lines between the color areas is not important. The filter 115 is coordinated with the lamps, which are not shown, such that a color temperature of 6300 K is produced, which corresponds to a bright sky or strong sunlight. The effect of a bright, sunny day is additionally supported by a reflector 116 which reflects the light it receives against the technical part of the scene 111 with a color temperature of 7000 K.

The scenery also includes a person 117, on whom it is desired to produce so-called warm skin tones in the photograph. For this purpose the person 117 is illuminated by a reflector 118 which reflects light with a color temperature of 5000 K. The reflector 118 has the color areas R and G divided such that the boundary lines between these color areas are of an arbitrarily curved configuration. The warm tone of such a photograph can be further enhanced by a floodlight 119 which again is equipped with a filter similar to that of FIG. 28, in which, however, the proportions of area are designed such that a color temperature of the light blend of 4800 K is produced. Special lighting effects, which especially enhance the three-dimensional effect of the photograph, are produced by a spotlight 121 with a filter 122 which corresponds to FIG. 28, but is designed for a color temperature of 4200 K. The same purpose is also served by a projector 123 with a filter 124, which as a whole is designed for a color temperature of 5500 K.

The studio set-up shown in FIG. 2 is intended to demonstrate that it is possible by using only two filter colors having the characteristic and distribution in accordance with the invention to cover a wide range of color temperatures between 2000 and 7000 Kelvin. This, however, does not exhaust the possibilities for the influencing of direct and reflected light. By increasing the green content, it is possible to further increase the color temperature toward values which can no longer be determined with the measuring instruments available. Likewise, it is possible to lower the color temperature below the level of 4200 K, for example in the candlelight range (about 2000 K), so that so-called "romantic effects" can also be achieved.

I claim:

1. Process for color synthesis by optical mixing of a plurality of colors and varying the relative intensity of at least one of the colors for the purpose of producing a great number of hues over a spectral range, comprising: using optical means for supplying exlcusively two colors, one of which ("red-violet") described by a first transmission curve has, in the spectral range between about 300 and 580 nm, an intensity or transmission maximum between 370 and 460 nm and a minimum between 540 and 580 nm, from which minimum said first transmission curve first rises steeply up to about 620 nm to a value of the order of magnitude of the maximum, and from then on rises continuously less steeply into the infrared range above about 780 nm, and the other of which ("green") decribed by a second transmission curve has, in the spectral range between about 300 and 670 nm, a transmission maximum between 520 and 560 nm and a minimum between 640 and 670 nm, from which minimum said second transmission curve rises continously to a transmission value which, at 750 to 770 nm, lies approximately in the range of the maximum, and using optical means for mixing the two colors.

2. Process of claim 1, for forming an image within a restricted image field, comprising: locally varying mixing of several colors and local variation of the relative intensity ("saturation") of at least one of the two colors.

3. Process in accordance with claim 2, comprising: passing a light beam successively through two filters with the colors "red-violet" and "green", which filters overlap one another at least in portions of the image field, and capturing the colored light rays emerging from the filters on a common projection surface with additive color mixing.

4. Process of claim 3, comprising: arranging a plurality of identical filter groups in the image field in regular distribution and in the same alignment, and scanning these filter groups by the light beam in rapid succession.

5. Process of claim 4, comprising: making the light beam oscillate across the seams between directly adjacent filters or filter groups and the hue of the light beam emerging from the filter groups being influenced by different relative times of stay of the light beam in the individual filters or filter groups.

6. Process of claim 5, comprising: influencing the hue of the light beam emerging from the filter groups by varying the beam cross section in proportion to the filter dimensions transversely of the light beam.

7. The process in accordance with claim 1, which includes using at least one color filter R1, R2, "red-violet" in the beam from a light source.

8. The process in accordance with claim 1, which includes using at least one color filter G1, G2 "green" in the beam from a light source.

9. Apparatus for the practice of a process for color synthesis by optical mixing by a plurality of colors and varying the relative intensity of at least one of the colors for the purpose of producing a great number of hues over a spectral range, the process comprising: using optical means for suppling exclusively two colors, one of which (red-violet) described by a first transmission curve has, in the spectral range between about 300 and 580 nm, an intensity or transmission maximum between 370 and 460 nm and a minimum between 540 and 580 nm, from which minimum said first transmission curve first rises steeply up to about 620 nm to a value of the order of magnitude of the maximum, and from then on rises continuously less steeply into the infrared range above 780 nm, and the other of which ("green") decribed by a second transmission curve has, in the spectral range between about 300 and 670 nm, a transmission maximum between 520 and 560 nm and a minimum between 640 and 670 nm, from which minimum said second transmission curve rises continuously to a transmission value which, at 750 to 770 nm, lies approximately in the range of the maximum, and using optical means for mixing the two colors; the apparatus comprising:

(a) two light sources for the emission each of a focused light beam, a first green filter (G1) being disposed in the vicinity of one of the light sources, and a first red-violet filter (R1) being disposed in the vicinity of the other light source, and the colored beams being directed against an at least partially common surface, (b) two defined openings disposed in this common surface in close adjacency to one another, in a second green filter (G2) being disposed in one opening and a seond red-violet filter (R2) being disposed in the other opening, the second green filter (G2) being disposed on a side of the light source with the first green filter (G1) and the second red-violet filter (R2) on the side of the light source with the first red-violet filter (R1), (c) the two beams overlapping fully in an area of the second red-violet filter (R2) and overlapping in an area of the second green filter (G2) on approximately half of the side facing the second red-violet filter (R2) and (d) a projection surface disposed approximately parallel to the common surface at a distance "d", this distance "d" being selected such that the colored light rays emerging from the second filters (G2, R2) partially overlap.

10. Apparatus of claim 9, in which the ratio of the optical densities of the first green filter to the second are at least 2:1 and the ratio of the optical densities of the first red-violet filter to the second are no more than 1:6.

11. Apparatus for the practive of the process for color synthesis by optical mixing by a plurality of colors and varying the relative intensity of at least one of the colors for the purpose of producing a great number of hues over a spectral range, the process comprising: using optical means for supplying exclusively two colors, one of which (red-violet) described by a first transmission curve has, in the spectral range between about 300 and 580 nm, an intensity or transmission maximum between 370 and 460 nm and a minimum between 540 and 580 nm, from which minimum said first transmission curve first rises steeply up to about 620 nm to a value of the order of magnitude of the maximum, and from then on rises continuously less steeply into the infrared range above 780 nm and the other of which ("green") decribed by a second transmission curve has, in the spectral range between about 300 and 670 nm, a transmission maximum between 520 and 560 nm and a minimum between 640 and 670 nm, from which minimum said second transmission curve rises continuously to a transmission value which, at 750 to 770 nm, lies approximately in the range of the maximum, and using optical means for mixing the two colors, the apparatus comprising:

(a) two light sources for the emission each of a focused light beam, a first green filter (G1) being disposed in the vicinity of one the light sources, and a first red-violet filter (R1) being disposed in the vicinity of the other light source, and the colored beams being directed aganist an at least partially common surface, (b) two defined openings disposed in this common surface in close adjacency to one another, a second green filter (G2) being disposed in one opening and a second red-violet filter (R2) being disposed in the other opening, the second green filter (G2) being disposed on a side of the light source with the first green filter (G1) and the second red-violet filter (R2) on the side of the light source with the first red-violet filter (R1), (c) the two beams overlapping fully in an area of the second red-violet filter (R2) and overlapping in an area of the second green filter (G2) on approximately half of the side facing the second red-violet filter (R2), and (d) a projection surface disposed approximately parallel to the common surface at a distance "d", this distance "d" being selected such that the colored light rays emerging from the second filters (G2, R2) partially overlap, for the production of a mixed light from the colors "green" and "red-violet" for use as correction means in color projection; the apparatus comprising:
one green filter and one red-violet filter disposed side by side in a common mounting, which can be moved gradually by means of the mounting, in accordance with the color proportions desired in the mixed light, through the beam of a light source.

12. Apparatus for the practice of a process for color synthesis by optical mixing by a plurality of colors and varying the relative intensity of at least one of the colors for the purpose of producing a great number of hues over a spectral range, the process comprising: using optical means for supplying exclusively two colors, one of which (red-violet) decribed by a first transmission curve has, in the spectral range between about 300 and 580 nm, an intensity or transmission maximumn between 370 and 460 nm and a minimum between 540 and 580 nm, from which minimum said first transmission curve first rises steeply up to about 620 nm to a value of the order of magnitude of the maximum, and from then on rises conitnuously less steeply into the infrared range above 780 nm, and the other of which ("green") described by a second transmission curve has, in the spectral range between about 300 and 670 nm, a transmission maximum between 520 and 560 nm and a minimum between 640 and 670 nm, from which minimum said second transmission curve rises continuously to a transmission value which, at 750 to 770 nm, lies approximately in the range of the maximum, and using optical means for mixing the two colors; the apparatus comprising:

(a) two light sources for the emission each of a focused light beam, a first green filter (G1) being disposed in the vicinity of one of the light sources, and a first red-violet filter (R1) being disposed in the vicinity of the other light sources, and the colored beams being directed against an at least partially common surface, (b) two defined openings disposed in this common surface in close adjacency to one another, a second green filter (G2) being disposed in one opening and a second red-violet filter (R2) being disposed in the other opening, the second green filter (G2) being disposed on a side of the light source with the first green filter (G1) and the second red-violet filter (R2) on the side of the light source with the first red-violet filter (R1), (c) the two beams overlapping fully in an area of the second red-violet filter (R2) and overlapping in an area of the second green filter (G2) on approximately half of the side facing the second red-violet filter (R2), and (d) a projection surface disposed approximately parallel to the common surface at a distance "d", this distance "d" being selected such that the colored light rays emerging from the second filters (G2,R2) partially overlap, the color filters being in the form of complementary step filter.

13. Apparatus of claim 12, in which color filters are of an L-shaped configuration and are assembled complementarily such that the common envelope surface is a parallelepiped.

14. Apparatus of claim 13, in which a plurality of such filters are configured strip-wise and are mounted in an arrangement of lines behind a projection surface.

15. Apparatus for the practice of a process for color synthesis by optical mixing by a plurality of colors and varying the relative intensity of at least one of the colors for the purpose of producing a great number of hues over a spectral range, the process comprising: using optical means for supplying exclusively two colors, one of which (red-violet) described by a first transmission curve has, in the spectral range between about 300 and 580 nm, an intensity or transmission maximum between 370 and 460 nm and a minimum between 540 and 580 nm, from which minimum said first transmission curve first rises steeply up to about 620 nm to a value of the order of magnitude of the maximum, and from then on rises continuously less steeply into the infrared range above 780 nm, and the other of which ("green") described by a second transmission curve has, in the spectral range between about 300 and 670 nm, a transmission maximum between 520 and 560 nm and a minimum between 640 and 670 nm, from which minimum said second transmission curve rises continuously to a transmission value which, at 750 to 770 nm, lies approximately in the range of the maximum, and using optical means for mixing two colors; the apparatus comprising:

(a) two light sources for the emission each of a focused light beam, a first green filter (G1) being disposed in the vicinity of one of the light sources, and a first red-violet filter (R1) being disposed in the vicinity of the other light source, and the colored beams being directed against an at least partially common surface, (b) two defined openings disposed in this common surface in close adjacency to one another, a second green filter (G2) being disposed in one opening and a second red-violet filter (R2) being disposed in the other opening, the second green filter (G2) being disposed on a side of the light source with the first green filter (G1) and the second red-violet filter (R2) on the side of the light source with the first red-violet filter (R1), (c) the two beams overlapping fully in an area of the; second red-violet filter (R2) and overlapping in an area of the second green filter (G2) on approximatly half of the side facing the second red-violet filter (R2), and (d) a projection surface disposed approximately parallel to the common surface at a distance "d", this distance "d" being selected such that the colored light rays emerging from the second filters partially overlap, the color filters being in the form of complementary wedge filters.

16. Apparatus of claim 15, in which the color filters are wedge-shaped and are assembled complementarily such that the common envelope surface is a prallelepiped.

17. Apparatus for the practice of a process for color synthesis by optical mixing of a plurality of colors and varying the relative intensity of at least one of the colors for the purpose of producing a great number of hues over a spectral range, comprising: using optical means for supplying exclusively two colors, one of which described by a first transmission curve has, in the spectral range between about 300 and 580 nm, an intensity or transmission maximum between 370 and 460 nm and a minimum between 540 and 580 nm, from which minimum said first transmission curve first rises steeply up to about 620 nm to a value of the order of magnitude of the maximum, and from then on rises continuously less steeply into the infrared range above about 780 nm, and the other of which ("green") described by a second transmission curve has, in the spectral range between about 300 and 670 nm, a transmission maximum between 520 and 560 nm and a minimum between 640 and 670 nm, from which minimum said second transmission curve rises continuously to a transmission value which, at 750 to 770 nm, lies approximately in the range of the maximum, and using optical means for mixing the two colors; the apparatus comprising:

(a) two light sources for the emission each of a focused light beam, a first green filter (G1) being disposed in the vicinity of one of the light sources, and a first red-violet filter (R1) being disposed in the vicinity of the other light source, and the colored beams being directed against an at least partially common surface, (b) two defined openings disposed in this common surface in close adjacency to one another, a second green filter (G2) being disposed in one opening and a second red-violet filter (R2) being disposed in the other opening, the second green filter (G2) being disposed on a side of the light source with the first green filter (G1) and the second red-violet filter (R2) on the side of the light source with the first red-violet filter (R1), (c) the two beams overlapping fully in an area of the second red-violet filter (R2) and overlapping in an area of the second green filter (G2) on approximately half of the side facing the second red-violet filter (R2), and (d) a projection surface disposed approximately parallel to the common surface at a distance "d", this distance "d" being selected such that the colored light rays emerging from the second filters (G2, R2) partially overlap, area proportions of exclusively two transparent or reflective color areas (R,G) being selected in predetermined ratios between 0 and 100% and between 100 and 0%, respectively, and the color areas (R,G) being disposed in at least one reference surface.

18. The apparatus of claim 17, in which the color areas (R,G) are disposed with area percentages between 5 and 95% and between 95 and 5%, respectively, in frequently varying arrangement within a single reference surface.

19. The apparatus of claim 18, in which the color areas (R,G) are disposed in a grid-like distribution in a single reference surface.

20. The apparatus of claim 18, having configuration as a filter.

21. The apparatus of claim 18, having configuration as a reflector.

22. The apparatus of claim 20 associated with a light source.

* * * * *

UNITED STATES PATENT AND TRADEMARK OFFICE
CERTIFICATE OF CORRECTION

PATENT NO. : 4,740,059
DATED : April 26, 1988
INVENTOR(S) : Birger Boldt

It is certified that error appears in the above-identified patent and that said Letters Patent is hereby corrected as shown below:

Column 18, line 48 for "maximumn" read -- maximum --.

Column 20, lines 14 and 15 for "prallelepiped" read

-- parallelepiped --.

Column 20, line 22 before "described" read

-- red-violet --.

Signed and Sealed this

Seventh Day of February, 1989

Attest:

DONALD J. QUIGG

*Attesting Officer*    *Commissioner of Patents and Trademarks*